Aug. 28, 1945.  E. H. HAUG  2,383,722
AUTOMATIC RECTIFYING DEVICE
Filed March 9, 1943
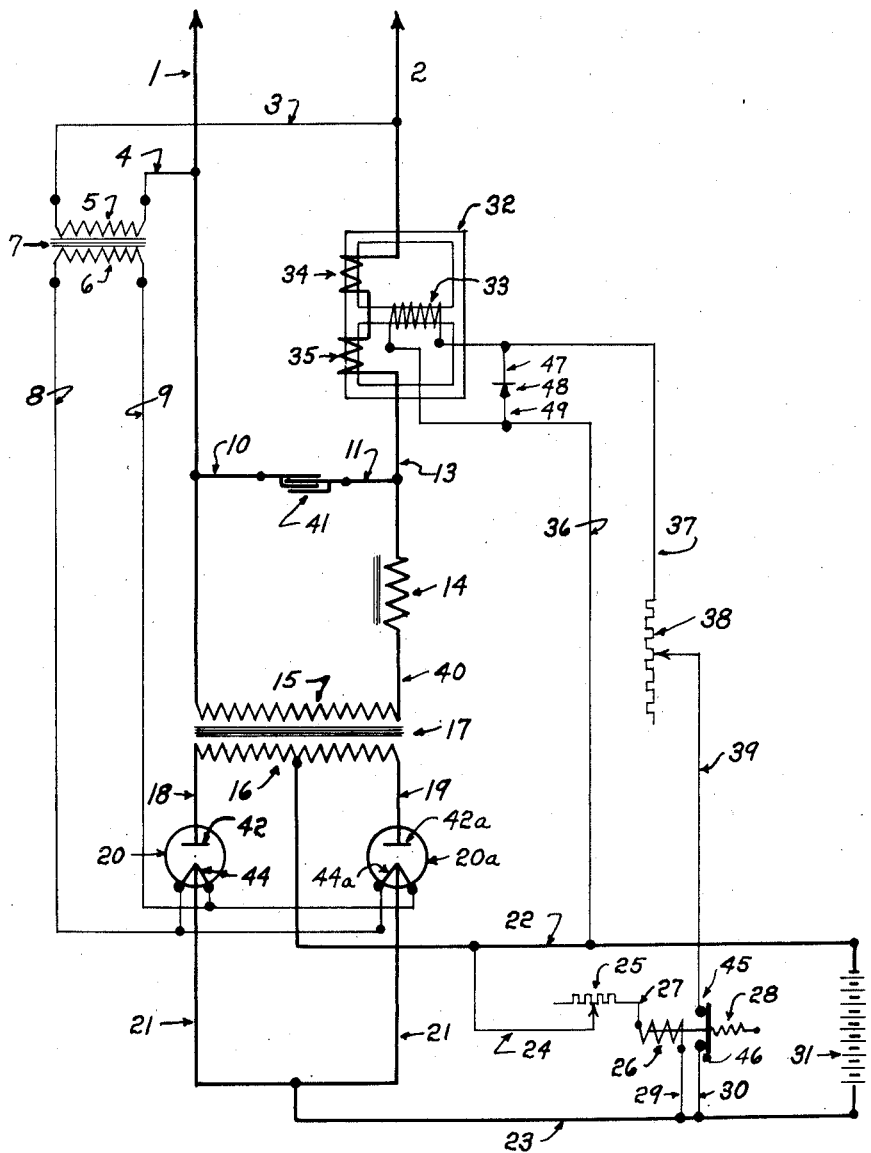
INVENTOR.
Eugene H. Haug.
BY Parker & Carter
ATTORNEYS Patented Aug. 28, 1945

2,383,722

UNITED STATES PATENT OFFICE 2,383,722

AUTOMATIC RECTIFYING DEVICE

Eugene H. Haug, Chicago, Ill., assignor, by direct and mesne assignments, to La Salle National Bank, Chicago, Ill., as trustee Application March 9, 1943, Serial No. 478,523

4 Claims. (Cl. 175—363)

My invention relates to an automatic, constant potential, constant current controlled, rectifying device, and is set forth herein as applied to battery charging, but it is desired that it be understood that the invention is not limited in its application to any particular device or to any particular class of devices.

One object of my invention is to provide an automatic battery charging rectifying device, incorporating a resonant circuit arrangement, which will automatically charge a battery with a current of constant potential characteristic, but upon overload said automatic charging rectifying device will break abruptly into a relatively constant current characteristic, thus limiting the current output. Furthermore, upon a condition where the battery voltage is up to its fully charged value, said automatic charging rectifying device will automatically trickle-charge the battery to any desired set value.

Another object of my invention is to provide an automatic rectifying device, incorporating a resonant circuit, which will protect the rectifier itself against excessive overloads.

Another object of my invention is to provide an automatic rectifying device, incorporating a resonant circuit, which is free from distortion of the current and voltage wave, thereby eliminating all telephone and radio interference.

Another object of my invention is to provide an automatic rectifying device, incorporating a resonant circuit, which maintains a high power factor by eliminating the wave form distortion and compensating for phase displacement.

Storage batteries are used extensively in power plants and substations to assure an uninterrupted source of power for operating circuit breakers, motor operated disconnecting switches, carrier-current remote control, etc., and to furnish emergency lighting.

To make possible the use of the smallest size battery that will meet the service requirements and to obtain the longest battery life, the floating method of battery operation is employed. In this method the battery charger is called on to operate continuously, and it must have capacity sufficient to carry the maximum continuous load on the battery circuit, plus the small current necessary to keep the battery fully charged, and thus ready for instant use, even in an emergency when all other sources of power fail. However, the charger must inherently possess the ability to protect itself against overloads, by leaving to the battery the supplying of the intermittent excess current demands, occasioned for example by the motor closing mechanism of circuit breakers. While under ordinary conditions the battery does very little work except at momentary intervals, the proper floating voltage must be maintained to prolong battery life. To meet these requirements the battery charging device must be able to maintain its voltage constant, regardless of what the continuous base load may be or how it may fluctuate.

Furthermore, the output voltage of the charging device must be readily adjustable over a wide range, making it possible to set the voltage at a point to trickle-charge the battery, as well as to supply the load up to the safe current limit of the rectifier elements. This adjustment is also useful in stepping up the charging rate, in the event the battery becomes discharged by reason of excessive overloads.

I have discovered that by using resonant constant potential to constant current circuit arrangements, in conjunction with rectifiers, and by automatically controlling one or more reactance elements of said resonant circuits by a voltage sensitive device, the above mentioned operating characteristics can be obtained. That is, the voltage characteristic is exceptionally flat from no load to full load, and then breaks abruptly into a relatively constant current characteristic at overload.

Referring to the drawing, Figure No. 1 shows a system wherein my invention has been embodied, in which lines 1 and 2 are connected to a constant potential alternating current supply. Saturating reactance 32 has its reactance windings 34 and 35 in series circuit relation between lines 2 and 13. An inductive reactor 14 is connected between lines 13 and 40. A capacitor 41 is connected between lines 13 and 1. A transformer 17 has its primary 15 connected to lines 1 and 40 respectively. Rectifier 20 has its anode connected to secondary 16 of transformer 17 by means of line 18, and rectifier 20a has its anode 42a connected to secondary 16 of transformer 17 by means of line 19. The cathode 44 of rectifier 20 is connected to cathode 44a of rectifier 20a by means of line 21. One end of battery 31 is connected to the midpoint of secondary 16 of transformer 17 by means of line 22, and the other end of the battery is connected to line 21 by means of line 23. A filament heating transformer 7 has its primary 5 connected to the alternating current supply lines 1 and 2 by means of lines 3 and 4. The secondary of filament transformer 7 has its secondary 6 connected to the cathode filaments 44 and 44a by means of lines 8 and 9.

Battery 31 is also connected to lines 22 and 23. A voltage sensitive device 50, consisting of spring 28, contacts 45 and 46, and operating solenoid 26, is connected to line 23 and contact 46 by means of line 30. Contact 45 of voltage sensitive device 50 is connected to adjustable resistor 38 by means of line 39. Solenoid 26 of voltage sensitive device 50 is connected at one of its terminals to line 23 by means of line 29. Its other terminal is connected to variable resistor 25 by means of line 27. The other end of variable resistor 25 is connected to line 22 by means of line 24. The series reactors 34 and 35 have their common core 32 saturated by means of coil 33. Coil 33 is connected to resistor 38 by means of line 37. Coil 38 is also connected to line 22 by means of line 36. An oxide rectifier 48 is connected to line 37 by means of line 47, and to line 36 by means of line 49.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit of my invention.

What I claim as new and desire to secure Letters Patent of the United States is:

1. An automatic rectifying device for use with an alternating current supply comprising a resonant type of constant potential to constant current transforming device, a rectifier, a direct current load connected to the otuput of the rectifier, a saturating winding associated with one of the reactance elements of the resonant circuit to vary the reactance thereof, a switch controlling connection of the saturating winding to the rectifier output, and means responsive to the voltage across the rectifier output to control the switch.

2. An automatic rectifying device for use with an alternating current supply comprising a resonant type of constant potential to constant current transforming device including an inductance coil wound on a core and a capacitor, a rectifier supplied by said device, a direct current load connected to the rectifier, a saturating winding on said core, a voltage sensitive device responsive to the voltage across the rectifier output to control the saturating winding, and a rectifying device connected across the saturating winding.

3. An automatic rectifying device for use with an alternating current supply comprising a resonant type of constant potential to constant current transforming device including an inductance coil wound on a core and a capacitor, a rectifier supplied by said device, a direct current load connected to the rectifier, a saturating winding on said core, connections from said saturating winding to the output of the rectifier, a switch in one of said connections, and means responsive to the voltage across the output of the rectifier to control the switch.

4. An automatic rectifying device for connecting an alternating current supply to a direct current load comprising a resonant type constant potential to constant current transforming device and a rectifier connected in series relation between the supply and the load, said device including a variable reactance element, means to control the effective reactance of said element, a switch controlling said means, and means responsive to the load voltage to operate the switch.

EUGENE H. HAUG.